May 12, 1931.                E. E. WEMP                1,804,906
GEAR SILENCER CONSTRUCTION
Filed Oct. 31, 1929
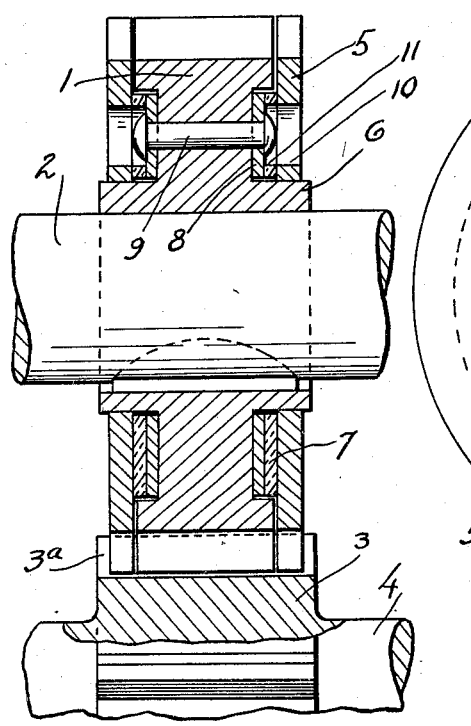
Fig. 1
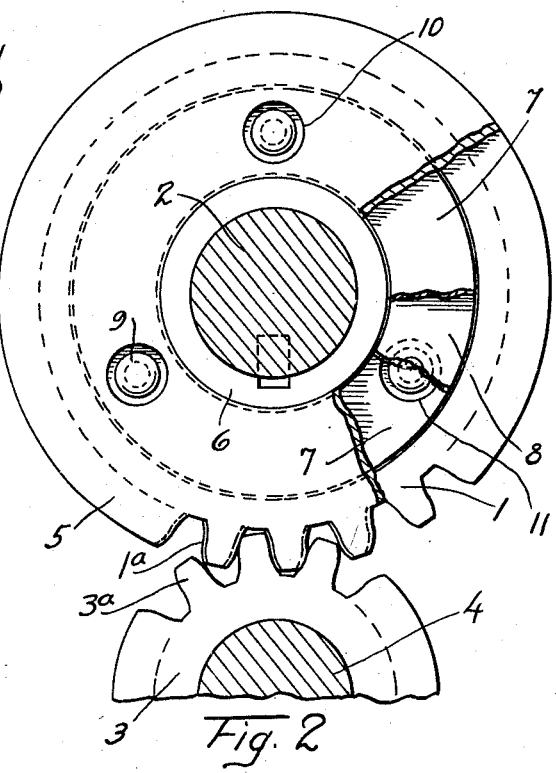
Fig. 2
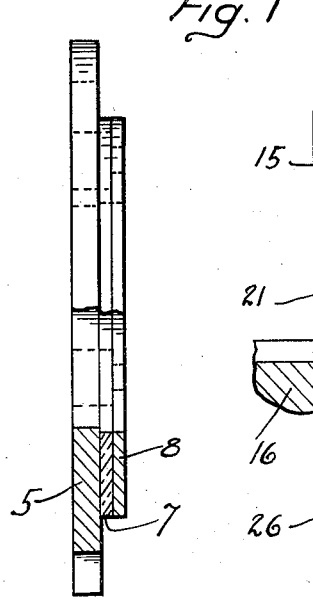
Fig. 3
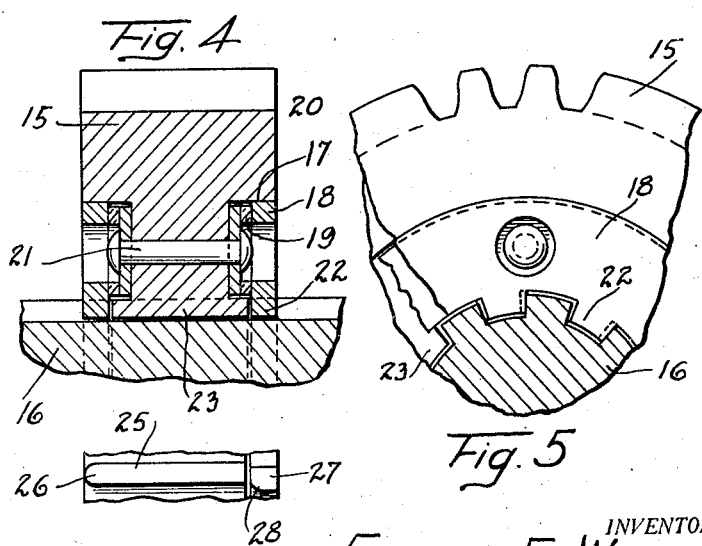
Fig. 4
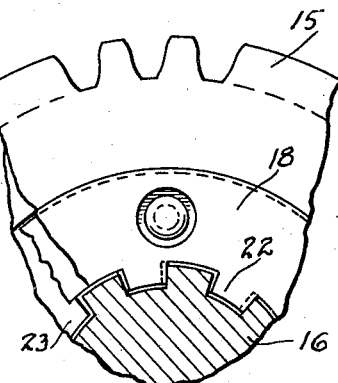
Fig. 5
Fig. 6
INVENTOR.
Ernest E. Wemp
BY
Stuart C. Barnes
ATTORNEY.

Patented May 12, 1931

1,804,906

UNITED STATES PATENT OFFICE

ERNEST E. WEMP, OF DETROIT, MICHIGAN

GEAR SILENCER CONSTRUCTION

Application filed October 31, 1929. Serial No. 403,696.

This invention relates to a gear silencer construction, and has to do especially with mating gears and/or an assembly where there is a meshing of gear teeth, or a member mounted upon a shaft with a spline or key connection or the like.

In the commercial production of mating gears, there is allowed a clearance between the mating teeth; this is to insure that the gears may rotate freely without binding and also to take care of distortion or warpage in the gears, especially, if they be hardened, or other similar irregularities. Due to this clearance, the mating elements are capable of a small amount of relative rotational movement; in the case of mating gears, a tooth can be moved within the groove defined by two teeth on the other; in case of a spline connection or the like between a shaft and an element mounted thereon, the projections or tongues on the shaft or element are moved in the groove defined by two tongues on the other. This is termed backlash. In the operation of a mechanism embodying such a construction, objectionable noises take place and this is especially true where the mating elements are subjected to torsional vibrations, as for example, in a transmission or other power transmitting devices of an automotive vehicle.

In accordance with the present invention a construction is provided wherein the mating elements can be constructed as heretofore so that the clearance is present, but means are provided so that the mating elements are held snugly connected to each other so that one is restrained from backlashing relative to the other. While the backlash is restrained, it is not prevented with a positive action and in this regard, the construction affords a resilient action which provides for a snug fit of intermeshing gears. More particularly, the invention contemplates the utilization of a rubber element so associated with at least one of the mating gears or other device, that the tension rubber element resists the backlash. This rubber element is associated with a gear and a secondary silencer gear both having teeth which mesh with another common gear.

The invention will be better understood by reference to the accompanying drawing and detailed description.

Fig. 1 is a sectional view taken through mating gears illustrating one of the gears equipped with a backlash silencer construction in accordance with this invention.

Fig. 2 is a face view of the gears illustrating the construction, with one of the gears cut away to show the construction.

Fig. 3 is a view illustrating the complementary gear and associated rubber element assembly.

Fig. 4 is a view illustrating a spline connection between a gear and shaft wherein the invention is utilized.

Fig. 5 is a view of the construction shown in Fig. 4 taken from the right hand side of Fig. 4.

Fig. 6 is a view of a portion of the gear illustrating a construction which may be employed in a selective gear transmission wherein one gear is adapted to be moved into engagement with another.

In these drawings, mating spur gears are shown, one gear being shown at 1 mounted upon shaft 2, and another gear at 3, mounted upon a shaft 4. Either gear may be the driving gear. The teeth of these mating gears, as will be noticed by reference to Fig. 2, are provided with the usual clearance so that "back-lash" of one gear with respect to the other may take place, especially if the gears are subject to torsional vibrations.

The back-lash silencer construction takes the form of a complementary gear or gears associated with one of the mating gears and meshing with the other. Such a complementary gear is shown at 5 and it is a narrow faced gear piloted upon a hub extension or shoulder 6 of the gear 1. This complementary gear is connected to the gear 1 in such manner that the teeth of the two gears are normally staggered relative to each other and in this regard a rubber element is utilized in the connection between these gears which is distorted when there is a tendency to line up the gear teeth on the two gears. This rubber element, as shown herein, takes the form of a disk or ring 7. This rubber ring is bonded to the complementary gear 5 and to a metallic washer 8. The washer 8 is held securely to the gear 1 as by means of rivets 9 and for this purpose the complementary gear 5 and rubber washer 6 are provided with an appropriate number of apertures 10 and 11. A similar complementary gear, rubber ring, and attaching washer assembly, may be attached to the opposite side of the gear 1 as shown in Fig. 1. The parts of this assembly are identical with the one just described and the assembly is also held by the rivets 9.

It is to be understood that the rubber element may be bonded directly to the gear 1 to the elimination of the washer 8 and rivets 9. However, from the standpoint of commercial production, it is deemed best to make the silencer assembly up as a unit comprising the three parts, to wit: the gear, rubber element, and attaching washer as shown in Fig. 3. The manufacture of the mating gears is quite distinct from the methods of manufacture employed in the bonding of metallic elements to rubber, and, accordingly, it is advantageous to provide the silencer assembly separate so that it can be attached to a gear readily as by means of rivets or the like. Any other type of connection may be used instead of the rivets.

When mating gears are assembled, the teeth intermesh much after the manner shown in Fig. 2, which depicts the clearance and the manner in which the complementary gears of the silencer unit function. The staggered relation between the teeth on gear 1 and gear 5 is such, preferably, that when the teeth are meshed with teeth of another gear, the teeth on gears 1 and 5 are displaced angularly with respect to each other. The result is that, as shown in Fig. 2, the teeth 1a on gear 1 contact on one side of the groove defined by two of the teeth 3a on gear 3, while the teeth 5a contact with the opposite side of the groove, and at this time the rubber element is under tension so that there is a snug yet yieldable engagement. The arrangement is such that the teeth 5a engage the side of the teeth 3a opposite that through which the power is being transmitted. For example, in the event that gear 1 is the driving gear, its rotation as viewed in Fig. 2 would be clockwise; if gear 3 is the driving gear as viewed in Fig. 2, then the rotation would be reversed so that gear 1 has a counter-clockwise movement. Thus the driving effort is at no time delivered through the rubber element nor is the rubber element distorted due to driving effort. This is the preferred arrangement, although an occasional operation in reverse manner will do no damage. It is to be understood that the silencer gear assembly may be placed on either both or on only one side of a mating gear.

In Figs. 4 and 5 there is shown a gear 15 splined to a shaft 16 so as to be capable of sliding movement on the shaft. In this case a complementary element 18 is piloted in a recess 17 in gear 15, and associated with the complemental element 18 is a rubber ring element 19, attaching washer 20 and rivet 21. The complemental element 18 has projections 22 which fit in the grooves of the spline on the shaft as in Fig. 5 so that the rubber element is placed under tension by angular displacement of the projections 22 relative to the projections 23 of the gear 15 when the same are placed in the groove on the shaft.

In some places, sliding gears are used for the purpose of meshing and demeshing the teeth of mating gears. The invention can be employed in such a construction, and it may be accomplished after the manner illustrated in Fig. 6, wherein a tooth of the sliding gear, illustrated at 25, is chamfered at its end as at 26 so as to readily move in between the teeth of a mating gear as is the usual practice. The teeth 27 and a complemental gear of the silencer unit are beveled or chamfered as at 28. Accordingly, as the gears move together, the beveled surface 28 causes the teeth 27 to displace angularly with respect to the teeth 25, and the beveled portion permits the teeth 27 to move into engagement with the mating gear. In a construction of this kind, the complemental gear of the silencer unit is utilized only on one side of the power transmitting gear.

Claims:

1. The combination with mating gears, a back-lash silencer construction comprising a silencer gear disposed along side of one of the mating gears, a rubber element bonded to the silencer gear, a holding washer bounded to the rubber element, and means for securing the holding washer to the said mating gear in such manner that the teeth of the silencer are staggered and displaced angularly upon their meshing with the teeth of the other mating gear so that the rubber element is normally under tension.

2. The combination with mating gears, a back-lash silencer construction comprising a silencer gear disposed along side of one of the mating gears, a rubber element bonded to the silencer gear, a holding washer bonded to to rubber element, and means for securing the holding washer to the said mating gear in such manner that the teeth of the silencer are staggered to a degree so that the staggered teeth snugly engage between teeth of a mating gear to resist back-lash under resilient action of the rubber.

3. In a mating gear assembly, a power transmitting gear, a silencer gear placed along side of the power transmitting gear, means on the first mentioned gear for piloting the second, a rubber washer-like member bonded to the silencer gear, a holding washer, said rubber element being also bonded to the holding washer, and means fixedly securing the holding washer to the power transmitting gear, the gear teeth of the two gears being staggered to such a degree that they are displaced angularly upon meshing of a cooperating power transmitting gear so that the rubber washer is placed under tension.

4. As a new article of manufacture, an assembly for silencing the back-lash of mating gears comprising a silencer gear, a holding element adapted to be secured to a mating gear, and a rubber element bonded to the silencer gear and holding element for establishing a connection between the two.

5. As a new article of manufacture, an assembly adapted for use with mating gears to silence the back-lash thereof comprising, a silencer gear, a washer-like member adapted to be secured to a mating gear, a washer-like rubber element bonded to the silencer gear and bonded to the washer-like holding member for establishing a connection between the two.

6. The combination of two mechanical elements having interengaging ridges and furrows, a silencer element associated with one of the first said mechanical elements and having similar ridges and furrows, a rubber element bonded to the silencer element and bonded to the mechanical element which is associated therewith, the arrangement being such that the ridges and furrows on one are staggered as regards the other so that upon engagement with the ridges and furrows of the other mechanical element, those of the silencer element and its associated mechanical element are angularly displaced with respect to each other to place the rubber under tension.

7. The combination with mating gears, a back-lash silencer construction comprising a silencer gear, means securing one of the mating gears and silencer gear together so that their teeth are normally staggered, said means including a rubber element, the staggered relation of the teeth being such that they are angularly displaced when meshed with the teeth of the other mating gear whereby the rubber element is distorted to effect a resilient but snug fit between the gears.

8. The combination with two mechanical elements having interengaging teeth, a silencer element associated with one of the first said mechanical elements and having teeth for engagement with the teeth of the other mechanical element, a rubber element associated with the first said mechanical element and the silencer element, said rubber element having a bond connection with one, and means connecting it to the other, the first said mechanical element and silencer element being arranged so that their teeth are staggered whereby the teeth relatively snugly fit into the teeth of the second mechanical element and resist back lash by resilient action of the rubber.

9. The combination with mating gears, of a silencer gear, means including a rubber element connecting one mating gear and the silencer gear, the teeth of the said one mating gear and the silencer gear being normally staggered with respect to each other whereby the teeth of these two connected gears snugly fit the teeth of the other mating gear and resist back lash by resilient action of the rubber.

10. The combination of two mechanical elements having interengaging teeth, a silencer element, means including a rubber element connecting the silencer element with one of the mechanical elements, teeth on said silencer element, the teeth on the silencer element and the teeth on the mechanical element to which it is connected being normally staggered with respect to each other, and the teeth on the silencer element engaging with the teeth on the other mechanical element whereby the teeth on the silencer element and the mechanical elements to which it is connected snugly fit the teeth of the other mechanical element and resist back lash by resilient action of the rubber.

In testimony whereof I have affixed my signature.

ERNEST E. WEMP.